Aug. 2, 1960 R. C. DAVIS 2,947,530
CONTROL DEVICE FOR VEHICLE SUSPENSION
Filed Feb. 13, 1956 2 Sheets-Sheet 1
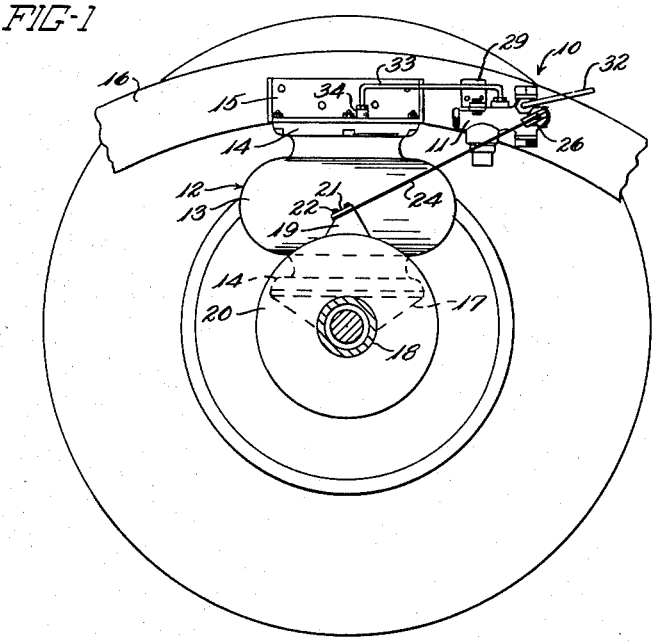
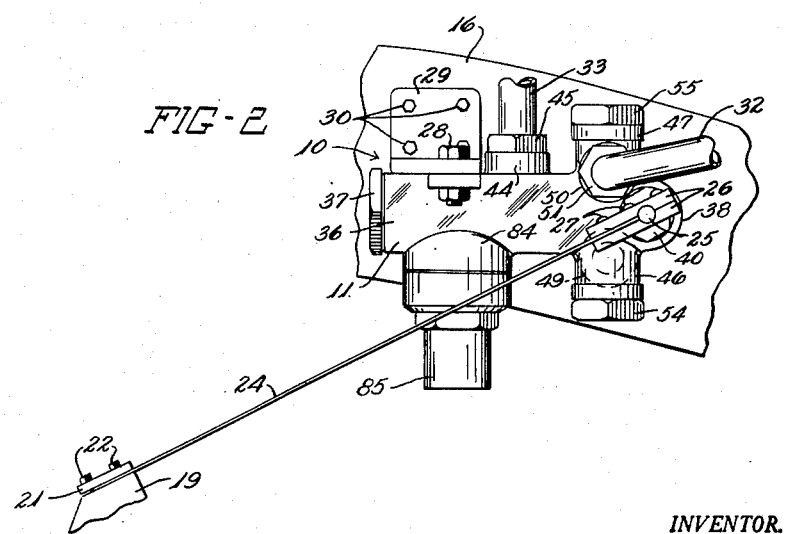
INVENTOR.
RALPH C. DAVIS
BY W. A. Fraser
ATTY.

Aug. 2, 1960  R. C. DAVIS  2,947,530
CONTROL DEVICE FOR VEHICLE SUSPENSION
Filed Feb. 13, 1956  2 Sheets-Sheet 2
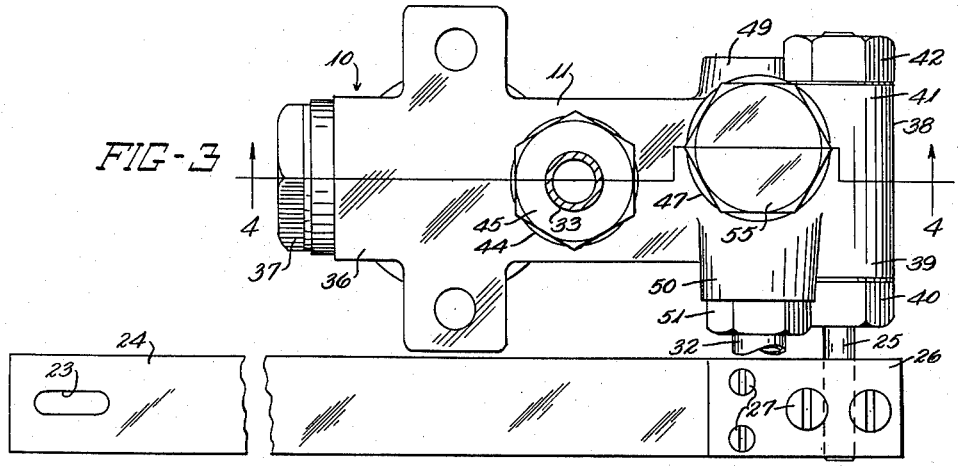
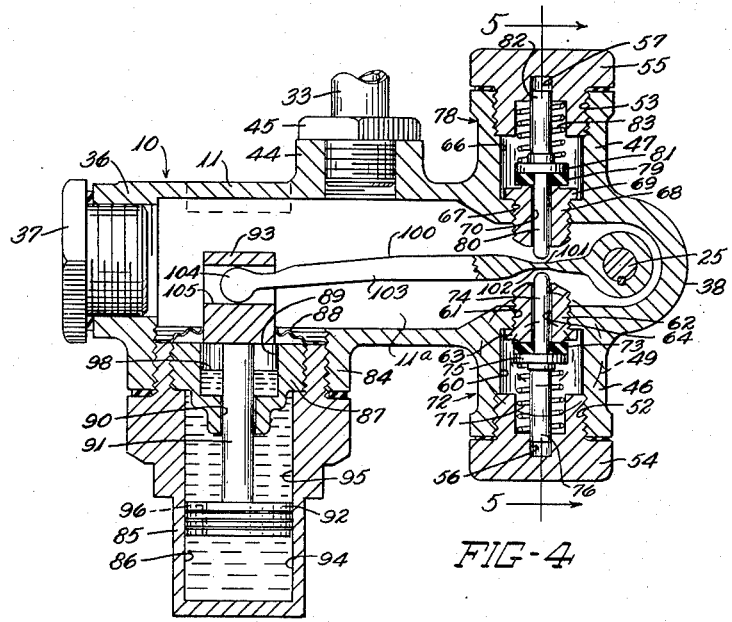
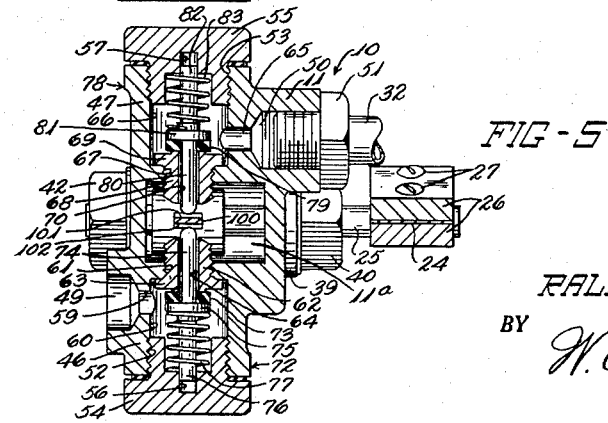
INVENTOR.
RALPH C. DAVIS
BY W. A. Fraser
ATTY.

United States Patent Office 2,947,530
Patented Aug. 2, 1960

2,947,530
CONTROL DEVICE FOR VEHICLE SUSPENSION

Ralph Charles Davis, Akron, Ohio, assignor to The Firestone Tire & Rubber Company, Akron, Ohio, a corporation of Ohio Filed Feb. 13, 1956, Ser. No. 565,195

4 Claims. (Cl. 267—65)

This invention relates generally to suspension systems for vehicles. More particularly, the invention relates to pneumatic suspension systems and provides means whereby pneumatic devices, such as bellows type air springs, may be made to respond to increased or decreased vehicle loads causing a substantial change in the riding level of the vehicle, and yet prevent unnecessary alteration of the riding level when the vehicle road gear passes over a bump or drops into a hole, which actions only momentarily alter the load on the suspension system.

Pneumatic suspension systems, incorporating air springs interposed between the vehicle frame and road or running gear, have been slow to achieve commercial success because they have not been provided with satisfactory valve means for controlling and regulating the air cushion within the air springs. Maintaining a constant average air spring length or air cushion under variable static load conditions, will provide a constant riding level for the vehicle.

A satisfactory valve means for effectively controlling the riding level of a vehicle having an air spring suspension, must be responsive to changing static load conditions. An increase in the load will compress the air spring. To restore the air spring to its initial position, air under increased pressure must be admitted into the air spring. A decrease in load will cause the air spring to extend or raise, and therefore, air must be exhausted or vented from within the air spring to restore it to its initial position.

In addition to controlling the supply and exhaust of air to and from an air spring, a satisfactory valve control means must embody therein a time delay so that momentary alteration of the static load on the suspension system, such as would be encountered during normal axle movement due to road irregularities, will not cause the valve to supply or exhaust air. This time delay feature is often referred to as "damping," the duration of which is determined by the weight of the vehicle, road conditions, etc.

The operation of the valve means also must not be influenced by the natural frequency of the vehicle suspension system which will probably be in the range of from 1 to 2 cycles per second.

Lastly, a satisfactory valve and its control means must be unaffected by and remain operative under extremes of temperature, humidity and exposure to sand, dirt, grease, oil and water.

It is therefore an object of this invention to provide an improved pneumatic suspension system for vehicles, which system includes improved valve and valve control means for controlling and regulating air springs interposed between the vehicle frame and road gear, so as to furnish a constant riding level for the vehicles and a constant average air spring length.

Another object is to provide an improved valve and control means for control and regulation of a vehicle air spring suspension, which controls the supply and exhaust of air to the air springs, has a time delay or "damping" feature, and is operative under extremes of temperature, humidity and other environmental conditions.

A further object is to provide an improved valve and control means located remotely of the air springs which will not react to bumps or holes in the road, but which will react to persistent changes in loading.

Still further, it is an object to provide a time delay or damping means which requires that there be a substantial displacement of the time delay components before the air supply or exhaust valves are actuated.

These and other objects will be apparent in view of the following detailed description of the invention considered with the attached drawings:

In the drawings:

Fig. 1 is a vertical sectional view through a vehicle axle showing a portion of the vehicle equipped with a pneumatic suspension system according to the invention;

Fig. 2 is an enlarged elevation showing the valve and control means and a portion of the vehicle frame;

Fig. 3 is a further enlarged top plan view of the valve and control means;

Fig. 4 is a sectional view taken substantially on line 4—4 of Fig. 3; and

Fig. 5 is a sectional view taken substantially on line 5—5 of Fig. 4.

In the present invention a ride control valve means, indicated generally by the numeral 10, includes a housing 11, which carries a damping means, and an air supply and exhaust control means. The housing 11 is located remotely and laterally of a conventional air spring bellows 12, of multi-ply rubber and cord construction and having one or more convolutions 13. The upper end of the air spring is hermetically fastened by a suitable clamp ring 14 to the underside of a horizontal transverse member 15 constituting a portion of the vehicle frame. The member 15 is securely affixed at either end to longitudinal frame members 16. The lower end of the air spring 12 is also hermetically fastened by a similar clamp ring 14 to the upperside of a bracket 17 on the axle housing 18 of the vehicle road gear. One mode of interposing an air spring between a vehicle frame and road gear has been shown and described. It will be understood, however, that the principles of the invention are applicable to air springs interposed in other ways between the frame and road gear. Also, only one air spring has been shown in connection with this invention, but it will be understood that the invention may be utilized with as many air springs as are required on a vehicle.

A stub flange 19, which may be located atop the vehicle differential housing 20, is provided with a removable plate 21 fastened thereto by screws 22. Between the plate and flange the screws 22 extend through an elongated slot 23 formed in the lower end of a control valve actuating spring 24. The slot 23 permits sliding movement of the spring 24, as the distance between the axle housing and vehicle frame changes, as described below. The upper end of the actuating spring 24 is fixed to one end of a control valve actuating shaft 25 by a pair of clamp plates 26 extending over the shaft and actuating spring and fastened together by screws 27.

The housing 11 is preferably located above and to the rear of the horizontal plane of the axle and is fastened by a bolt 28 to a support bracket 29. The bracket 29 is fastened by bolts 30 to a frame member 16. Air, from a source under pressure (not shown), is supplied to the control device 10 by suitable piping 32 having a conventional check valve (not shown) therein so that air cannot back out. The control device is connected by suitable piping 33 to an air spring fitting 34, which extends through the frame member 15 into the interior of the air spring. The piping 33 is the conduit for supplying air to and exhausting air from the air spring 12, through the control device 10, as referred to later.

The housing 11, which may be described generally as having an elongated interior bore and as being cylindrical in shape, has an open end 36 sealed by a removable threaded plug 37. The end of the housing opposite end 36 is closed as indicated at 38. As best shown in Figs. 3 and 4, adjacent the closed end 38 the actuating shaft 25 extends transversely through the housing 11. The end of the shaft fastened to the actuating spring 24 is journaled in a boss 39, on the side of the housing 11 and held in position by a nut 40. The other end of the shaft is journalled in a similar boss 41 and secured by a similar nut 42.

As best shown in Fig. 4, at a point approximately midway atop the housing 11 is a two-way or open bellows port 44 into which a fitting 45, attached to the piping 33, is tightly secured. Between the bellows port 44 and the closed end 38, are a pair of opposed valve and port housings 46 and 47 each at substantially right angles to the main housing 11. As best shown in Fig. 5, the bottom housing 46 has an air exhaust port 49 which vents from within the housing to the atmosphere. The upper housing 47 has an air supply port 50 into which a fitting 51, attached to the piping 32, is tightly secured. Both of the valve and port housings 46 and 47, have identical open ends indicated at 52 and 53, respectively. Each of the open ends are sealed by identical removable threaded plugs 54 and 55, respectively. Each of the plugs have identical internally facing bores, 56 and 57, respectively.

Referring to Figs. 4 and 5, the exhaust port 49 opens through a short lateral passage 59 in the bottom housing 46 into a vertical bore 60 having a reduced diameter threaded opening 61 at the upper end. Fitted into the opening 61 is a valve stem guide plug 62 having a collar 63 which seats at the upper end of the bore 60. A reduced diameter bore 64 extends axially of the plug 62 connecting the bore 60 with the interior bore 11a of the housing 11.

The supply port 50 has a similar arrangement for communicating with the interior bore 11a of the housing. A short lateral passage 65 opens through the wall of the upper housing 47 and connects the supply port with a vertical bore 66. The lower end of the bore 66 has a reduced diameter threaded opening 67 into which a second valve stem guide plug 68 is fitted. The plug 68 has a collar 69 seating at the lower end of the bore 66 and also has a reduced diameter bore 70 extending axially thereof.

Passage of air through the exhaust port 49, is controlled by a valve, indicated generally by the numeral 72. The valve 72 is movable within bore 60 and includes a flat, air impermeable disc 73, an actuating stem 74 loosely fitted in bore 64, a metal disc 75 to reinforce the disc 73, a guide stem 76 slidably fitted into the cap bore 56 and a valve spring 77 which normally seats the disc 73 on the collar 63 of the plug 62.

Passage of air through the supply port 50 is controlled by a valve, indicated generally by the numeral 78, which is identical with valve 72. That is, valve 78 is movable within bore 66 and includes a flat disc 79, an actuating stem 80, a reinforcing disc 81, a guide stem 82 and a valve spring 83 to seat disc 79 on the collar 69 of the plug 68.

Referring to Fig. 4, on the underside of the valve housing 11, adjacent the end 36, is a large diameter dashpot port 84, into which is fitted a cylindrical dashpot 85. The interior of the dashpot has a bore forming a chamber 86 opening into the housing 11. This open end is sealed by a dashpot plug 87 and a resilient membrane 88. The plug 87 has an upwardly opening well 89 and a vertical bore 90 opening into the chamber 86. The bore 90 loosely surrounds and guides the movement of the stem 91 of a dashpot piston 92. The upper end of the piston stem 91 extends through the resilient membrane and is attached to the underside of a piston actuating block 93. Within the dashpot 85, the area beneath the piston 92 defines a variable volume chamber 94. Above the piston and below the plug 87, the area within the dashpot defines another variable volume chamber 95. A small diameter orifice 96 through the piston connects the chambers 94 and 95.

As described in more detail below, each of the chambers 94 and 95 is completely filled with a suitable fluid such as hydraulic brake fluid. Sufficient fluid is added to also fill to the point indicated generally by the numeral 98 in the well 89 in the dashpot plug. Thus, fluid will pass between the well 89 and the chamber 95 along the sides of the bore 90.

As described above, the shaft 25 extends transversely through the housing 11. Attached to the shaft is a valve actuating bar 100 which extends longitudinally through the housing 11 within interior bore 11a. The actuating bar preferably has recessed portions 101 and 102, in the area of the bar which contacts the valve actuating stems 74 and 80, respectively. Beyond the recessed portions 101 and 102, the bar 100 preferably is curved slightly downward as at 103 and has a rounded knob 104 movably inserted into a transverse bore 105, in the piston actuating block 93.

The operation of the control device 10 is as follows.

Assume that the normal static load on the vehicle suspension requires the air springs to be inflated to a pressure of about 50 p.s.i. In this condition, the valves 72 and 78 are in the position shown in Figs. 2 and 3. This normal position is brought about because the valve springs 77 and 83 are so engineered as to always be tending to seat the discs 73 and 79, against the collars 63 and 69.

Now then, assume that the static load is increased, for example, by adding merchandise or passengers to the vehicle. As the load is increased, the upper frame members 15 and 16 move downwardly toward the axle housing 18, causing the air spring 12 to contract. During this downward movement of the upper frame members, the bracket 29 and the control device 10 also move downwardly. Such downward movement of the control device 10, causes the actuating shaft 25 to be turned by the actuating spring 24, the lower end of which is slidably attached to the differential housing, to permit sliding movement of the spring as the device 10 moves downwardly. That is, as the distance between the member 15 and the axle housing 18 decreases, the spring 24 will cause the shaft 25 to be rotated within the valve housing 11.

As viewed in Fig. 4, an increased load will cause the shaft 25 to rotate in a clockwise direction to supply air under pressure into the air spring 12. As the shaft 25 is rotated clockwise on its axis, the actuating bar 100 will tend to be displaced upwardly moving arcuately toward the valve actuating stem 80. However, the actuating bar cannot move upwardly without a corresponding upward movement of the dashpot piston 92 within the dashpot 85. The rate at which fluid is displaced from the upper chamber 95 into the lower chamber 94 is determined by the diameter of the orifice 96. Excess fluid, to compensate for the area of the piston stem 91, is supplied from the well 89 atop the plug 87.

When the piston 92 has moved upwardly a distance sufficient to cause the recessed portion 101 of the actuating bar to raise the valve stem 82, additional air will begin to flow from the supply port 50, into the interior 11a of the housing, and out the bellows port 44 to the air spring 12. As the piston 92 moves further upwardly, the disc 79 will be raised still further from its seat on the collar 69 and still more additional air will pass, through the interior of the housing, to the bellows port 44. This additional air must be under a greater pressure than the air already in the spring 12, and will extend the air spring to its initial position.

As the air spring extends, the upper frame members 15 and 16 move upwardly from the axle housing 18, causing the actuating shaft 25 to be turned by the actuating spring 24 in a counter-clockwise direction as viewed in Fig. 4. As the shaft 25 begins to assume the normal position shown in Fig. 4, the actuating bar 100, moving arcuately, will be released from contact with the valve stem 80 and the spring 83, which had been compressed by the upward movement of the disc 81, will return the disc 79 to its seat on collar 89, shutting off the flow of additional air into the interior 11a of the housing. As the air flow is shut off, the actuating bar 100 continues to force the piston 92 downward to its initial position, the flow of fluid from chamber 94 to 95 being reversed in direction.

If the static load on the vehicle suspension is decreased, the frame members 15 and 16 move upwardly away from the axle housing 18, causing the air spring 12 to extend. During this upward movement of the upper frame members, the control device 10 also moves upwardly. Such upward movement of the control device 10 causes the actuating shaft 25 to be rotated by the actuating spring 24, in the counter-clockwise direction as viewed in Fig. 4, said spring sliding with respect to the bolts 22 as the device 10 moves upwardly.

As viewed in Fig. 4, a decreased load will cause the shaft 25 to rotate in a counter-clockwise direction to exhaust air from within the air spring 12. As the shaft 25 is rotated counter-clockwise on its axis, the bar 100 will be displaced downwardly moving arcuately toward the valve actuating stem 74. As described above, the piston 92 must be displaced downwardly within the dashpot 85 before substantial downward movement of the actuating bar can occur. As the piston is forced downward by the actuating bar, fluid from the lower chamber 94 will flow, through orifice 96, into the upper chamber 95. During movement of the piston 92, excess fluid, to compensate for the area of the piston stem 91, is accumulated in the well 89 atop the plug 87.

As the piston 92 moves downwardly, the recessed portion 102 of the actuating bar 100 will contact and depress the valve stem 74, permitting exhaust air to flow from the air spring 12, through the bellows port 44, through the interior 11a of the housing and out the exhaust port 49 to the atmosphere.

As the air spring contracts, the upper frame members 15 and 16 move downwardly toward the axle housing 18 causing the actuating shaft to be rotated by the actuating spring 24 in a clockwise direction as viewed in Fig. 4. As the shaft 25 begins to assume the normal position shown in Fig. 4, the actuating bar 100, moving arcuately, will be released from contact with valve stem 74 and the spring 77, which has been compressed by the downward movement of the disc 75, will return the disc 73 to its seat against collar 63, shutting off the exhaust of air from the interior 11a of the housing.

When a vehicle equipped with a suspension system according to the invention is driven over rough roads with no change in the static loading, the vehicle wheels will move up and down over bumps and into holes in the road. However, the shaft 25 (and actuating bar) can not readily move because of the damping and time delay effect of the dashpot and piston 92. Thus, the admission of additional air to or exhaust of air from the air spring 12 will not occur until a force is maintained in one direction for a predetermined period of time which can be controlled by the diameter of orifice 96 in the piston 92. It will be found desirable to choose an orifice size which will provide a time lag of about 7 seconds before the recessed portions 101 and 102 will contact the valve stems 74 and 80. However, the time delay may be selected at any place within the preferred range of from 1 to 20 seconds.

A shut off valve (not shown) can be provided in the air spring line 33 so that an operator can shut off the line when raising the vehicle by a bumper jack to remove a tire.

While a preferred embodiment of the invention has been shown it will be apparent that changes and modifications, other than those specifically noted herein, could be made without departing from the basic principles of the invention. Therefore, the annexed claims are intended to embody therein changes of such nature.

What is claimed is:

1. A device for controlling the passage of fluid under pressure, comprising, a housing having an open port, a fluid supply port, a fluid exhaust port and an elongated interior bore permitting passage of fluid between said ports, said supply and exhaust ports being in an opposed relation transversely of said bore, valves within said housing blocking passage of fluid through said supply and exhaust ports, a journaled shaft extending transversely of said bore adjacent one end of said housing, an arcuately movable valve actuating bar extending longitudinally within said bore and affixed at one end to said shaft and extending between said valves, and hydraulic means at the other end of said actuating bar to dampen movement thereof toward said valves when said shaft is rotated.

2. A device for controlling the passage of fluid under pressure, comprising, a housing having an open port, a fluid supply port, a fluid exhaust port and an elongated interior bore permitting passage of fluid between said ports, said supply and exhaust ports being in an opposed relation transversely of said bore, valves within said housing blocking passage of fluid through said supply and exhaust ports, a journaled shaft extending transversely of said bore in a plane substantially perpendicular to the plane of said supply and exhaust ports and adjacent one end of said housing, an arcuately movable valve actuating bar extending longitudinally within said bore and affixed at one end to said shaft and extending between said valves, and hydraulic means at the other end of said actuating bar to dampen movement thereof toward said valves when said shaft is rotated.

3. Control means adapted for regulation of the supply and exhaust of air to and from an expansible bellows for a vehicle susepension system to maintain a predetermined height between the road gear and frame of the vehicle, comprising: a housing having an elongated interior bore through which said air passes, an open port, two control ports in opposed relation transversely of said bore adjacent one end of said housing and a fluid filled damping chamber adjacent the other end of said housing, said ports and said chamber each communicating with said bore; valves within said housing blocking passage of air through said control ports; a journaled shaft extending transversely of said bore in a plane substantially perpendicular to and adjacent the plane of said control ports; an arcuately movable valve actuating bar affixed at one end to said shaft and extending longitudinally within said bore between said valves; and hydraulic means affixed at the other end of said actuating bar and operable within said damping chamber to retard movement of said bar.

4. Control means adapted for regulation of the supply and exhaust of air to and from an expansible bellows for a vehicle suspension system to maintain a predetermined height between the road gear and frame of the vehicle, comprising: a housing having an elongated interior bore through which said air passes, an open port, an air supply port and an air exhaust port in opposed relation transversely of said bore adjacent one end of said housing and a fluid filled damping chamber adjacent the other end of said housing, said ports and said chamber each communicating with said bore; valves within said housing blocking passage of air through said supply and exhaust ports; a journaled shaft extending transversely of said bore in a plane substantially perpendicular to and adjacent the plane of said supply and exhaust ports; an arcuately movable valve actuating bar affixed at one end to said shaft and extending longitudinally within said bore between said valves; and hydraulic means affixed at the other end of said actuating bar and operable within said damping chamber to retard movement of said bar.

References Cited in the file of this patent

UNITED STATES PATENTS

| | | |
|---|---|---|
| 1,371,648 | Schmidt | Mar. 15, 1921 |
| 1,492,140 | Morski | Apr. 29, 1924 |
| 2,426,692 | Katz | Sept. 2, 1947 |
| 2,567,774 | Le Clair | Sept. 11, 1951 |
| 2,670,201 | Rossman | Feb. 23, 1954 |
| 2,691,990 | Ashton et al. | Oct. 19, 1954 |
| 2,781,781 | Hruska | Feb. 19, 1957 |